United States Patent [19]

Ruggeri

[11] Patent Number: 4,519,279
[45] Date of Patent: May 28, 1985

[54] SELFCENTERING WORK-REST

[76] Inventor: Stefano Ruggeri, 8, Via Portazza, I 40139, Bologna, Italy

[21] Appl. No.: 409,214

[22] Filed: Aug. 18, 1982

[30] Foreign Application Priority Data

Sep. 16, 1981 [IT] Italy .................................. 3530 A/81

[51] Int. Cl.³ ............................................ B23B 25/00
[52] U.S. Cl. ...................... 82/38 R; 82/39; 51/238 S
[58] Field of Search ...................... 82/38 R, 39, 40, 45, 82/42, 34 A; 51/238 R, 238 S; 279/33, 34

[56] References Cited

U.S. PATENT DOCUMENTS

| 3,320,839 | 5/1967 | Dinsmore | 82/39 |
| 3,535,963 | 10/1970 | Dietl | 82/38 R |
| 4,265,150 | 5/1981 | Burford | |

FOREIGN PATENT DOCUMENTS

| 422198 | 7/1921 | Fed. Rep. of Germany . | |
| 32505 | 10/1964 | Fed. Rep. of Germany | 82/38 R |
| 2851961 | 7/1969 | Fed. Rep. of Germany . | |
| 1295578 | 1/1970 | Fed. Rep. of Germany . | |
| 1483772 | 2/1966 | France . | |
| 1426689 | 4/1966 | France | 82/38 R |
| 2118995 | 12/1971 | France . | |
| 2223543 | 3/1974 | France . | |
| 2041263 | 9/1980 | United Kingdom . | |

OTHER PUBLICATIONS

"SMW", brochure published in Germany, Jul. 1976.

Primary Examiner—Leonidas Vlachos
Assistant Examiner—Jerry Kearns
Attorney, Agent, or Firm—Sughrue, Mion, Zinn, Macpeak, and Seas

[57] ABSTRACT

Work-rest for use primarily with machine tools, provided with a prehensile, selfcentering, automatic and double-acting equipment. This equipment is composed of a tern of rollers, whose centripetal simultaneous displacement, that assures the coaxiality of the workpiece, is realized by a pair of symmetrical double-acting grooves made on interchangeable lever arms whose angular movement is enslaved to the axial sliding of a central push rod double acting, grasping and expanding. The interchangeability of the arms of the double-acting prehensile equipment makes possible the use of only one work-rest body for a larger dimensional range of workpieces, both from the outside and from the inside with a considerable saving of operating cost.

2 Claims, 1 Drawing Figure

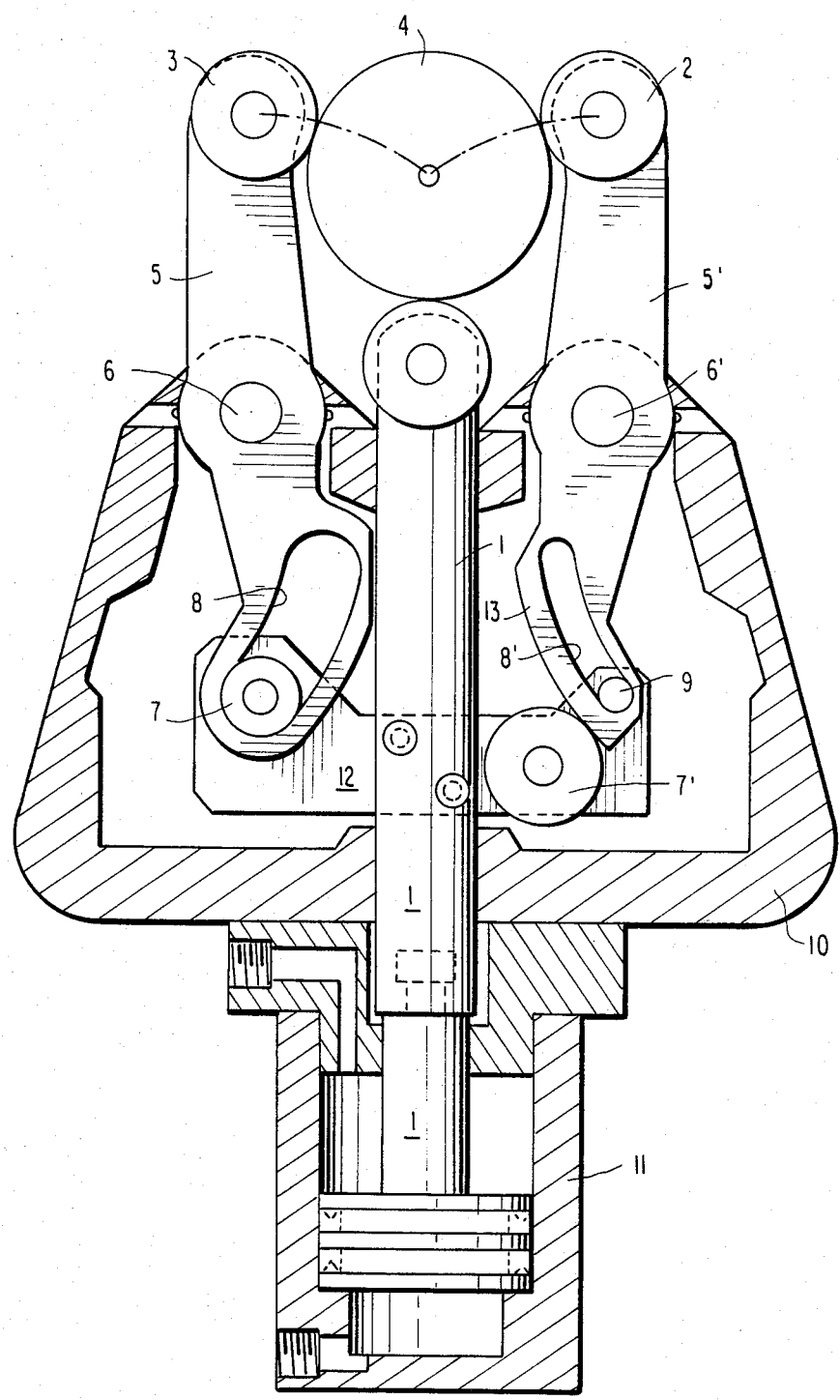

SELFCENTERING WORK-REST

TECHNICAL FIELD

This invention relates to the field of the attachments for machine tools and particularly to selfcentering work-rests able to support the workpiece, to prevent it from flexing in any direction and particularly to center the workpiece and mantain that center in a fixed position conciding with the axis of rotation thereof while said workpiece is being operated upon.

A further characteristic is the possibility of working solids of rotation with varying diameter, as conical surfaces.

STANDARD OF THE TECHNIQUE

At the present standard of the technique, many types of selfcentering work-rest provided with a tern of rollers are known in the field of the attachments for machine tools.

In the already well-known types of work-rest the centripetal displacement of the two side-rollers is enslaved to the axial sliding of the 3rd roller by means of different systems. In the well-known German Patent PS No. 874 548 the identity of the centripetal simultaneous displacement of the team of rollers, that assures the coaxiality of the workpiece, is realized by gears and racks, as described in that patent. That work-rest is too expensive and has also the considerable disadvantage of wear and tear causing centering imprecisions during the working. In the prior art the English Patent GB No. 712 685 and the U.S. Pat. Nos. 2,160,378 and 3,234,829 are known.

Moreover the German Applications OS No. 1 602 740; OS No. 1 602 742; OS No. 2 542 959 and OS No. 2 547 615 are known but they all have been withdrawn or rejected definitely.

Examining these documents you can notice that the selfcentering displacement of the three rollers is realized by one-way articulated connections and so return springs to re-open the work-rest are necessary.

Besides all the embodiments of the well-known work-rests are very complex and they meet the requirements of modern technology no more. In fact in the known selfcentering work-rest there are the vibrations of the return springs causing wear and tear and inexactness. Moreover the prior work-rests can be used only for one size because they have not the possibility of changing the lever arms of the prehensile equipment and they cannot use a single work-rest body for different sizes.

In any prior work-rests the grasp is double-acting and so they cannot support a hollow piece from the inside.

Besides in the prior work-rests the opening and closing drive of the selfcentering equipment is not enslaved to the copy device of a copying lathe.

The problem to be solved is to realize an universal work-rest provided with interchangeable lever arms double acting. "Double acting" means that the prehensile equipment is able to act both from the outside and from the inside, both grasping and expanding.

Besides the new work-rest has no expansive gears and racks and no vibrating return springs.

The solution of these problems, avoiding all the disadvantage of the prior work-rests, has required deep technological studies and cotrolled experiments. The result has neen issued by the originality of an inventive effort superior to the average design capacity of the expert in this field of the technique.

DESCRIPTION

The present invention relates to an universal, automatic, selfcentering and double-acting work-rest. It is provided with a prehensile interchangeable equipment composed of a tern of rollers, whose centripetal simultaneous displacement, that assures the coaxiality of the workpiece, is realized by a pair of double-acting grooves made on the interchangeable lever arms, whose angular displacement is enslaved to the axial sliding of a central push rod moving forwards and backwards to obtain opening and closing action of the prehensile equipment.

Said double-acting grooves are made on the inside extremity of two interchangeable lever arms, on the other extremity of them there are two rollers of the prehensile tern; the third roller of the prehensile tern is set in the outside extremity of the central push rod sliding axially forwards and backwards by idro-pneumatic means.

To the axial sliding of the central push rod is enslaved the angular, centripetal, double-acting movement of the symmetrical interchangeable grooved levers which are pivoted symmetrically in two fixed points of the body of the work-rest.

The geometrical shape and the symmetry of the two grooves in relation with the axial sliding of the central push rod, is able to assure, both opening and closing, the identity of the simultaneous radial movement of the three rollers forming the prehensile team of this work-rest.

The original inventive features characterising the novelty of this invention are pointed out in the following specified description with reference to the enclosed schematic drawings. FIG. 1 is a section of the selfcentering work-rest and shows two symmetrically compared embodiments of it. In FIG. 1 is indicated that the workpiece 4 is grasped from the outside by the prehensile tern formed of three rollers 1;2;3. In the same way the workpiece can be grasped from the inside (that is not showed because of its semplicity).

The roller 1 is set in the outside extremity of the central push rod 1. The push rod 1 slides axially forwards and backwards, i.e. opening and closing. This axial movement is driven by a double-acting idro-pneumatic jack 11 which can be enslaved to well-known copy systems according to the variability of the diameter of the workpiece.

The push rod 1 brings an interchangeable cross-piece 12. In the cross-piece 12 there is an enslaving roll 7 engaged in the double-acting groove 8 made on the inside extremity of the interchangeable lever arm 5. Said lever 5 is pivoted in 6 to the body 10. Said interchangeable lever 5 brings the roller 3 to the outside extremity. Symmetrically to the push rod 1, the roller 2 is set on the outside arm of the interchangeable lever 5' which is pivoted in 6'. In said lever 5' a smaller groove 8' is made in which a smaller roller 9 set in the cross-piece 12 is engaged. Moreover the cross-piece 12 brings the roller 7' which pushes against the shape 13.

The steady-rest works in the following way: during the working the piece 4 is subjected to the forces exerted by the tool. The team of rollers 1;2;3 engages the workpiece and continues to engage it during the machine operations and that assures the coaxiality of the work. The grasp action (that showed one is from the outside) is assured by the force of the jack 11 controlled by well-known hydraulic means. In the same way the grasp action by expansion (not showed) is assured by the double-acting jack 11, because this is a selfcentering and double-acting work-rest. The team of the rollers is selfcentering in the two grasping ways. The automatic centering for every diameter is assured by fhe fact that the radial movements of the three rollers are simultaneous: when roller 1 moves from the center, the other two rollers follow it and the centering tern acts automatically in two ways both opening and closing.

The two symmetrically compared embodiments in FIG. 1 point out the versatility of this universal work-rest; in fact levers 5 and 5' are easly interchangeable and that enlarges the range of diameters that can be worked. The feature of the interchangeability of the arms or levers 5 and 5' and the interchangeability of the cross-piece 12 is one of the inventive cardinal points of the present invention. This feature permits to realize many works with economy of cost. Moreover the rollers 1;2;3 can be fitted to act from the inside, i.e. in expansion, to support a hollow piece from the inside during the working of its outsider diameter.

A further characteristic use of this selfcentering double-acting work-rest is to apply it to the tool-carrier as a moving work-rest for example on a copy lathe to work varying diameter pieces. In this case the moving work-rest must change its grasping diameter continually, and that is possible connecting the jack 11 to the toucher of the hydraulic copy means.

The object of this invention can be used also as a moving work-rest and this gives evidence to the originality of the inventive effort superior to the average design capacity of the expert in this technical field. This selfcentering double-acting copy work-rest provided with interchangeable lever arms realizes a progress in this technical field and it is an attachment of high technological level. Prior work-rests provided with return springs cannot avoid the vibrations causing inconvienience both in working and in life of the attachment self.

Only introducing a work-rest provided with double-acting grooves as enslaving articulated joints the simultaneity of the radial movements of the double-acting prehensile team is assured and moreover this attachment can be used also in connection with copy lathe.

As it has been described, this work-rest can be used to support the extremity of a hollow workpiece from the inside.

FIG. 1, right side, shows an alternative embodiment: roller 9 engaged in groove 8', roller 7' pressing the shape 13. It is evident that with the same body 10 heavier workings can be realized because the press-roller 7' is larger. In this case the double-act effect is realized by the roller 9 engaged in groove 8'. The cross-piece 12 can be interchanged too and roller 7 can be set on said cross-piece 12 in different position. This fact enlarges the possibility of fitting different equipments inside the same body 10 and this original characteristic points out the universal employment of this invention.

This invention can be realized in different sizes, materials and fluid drives because the cardinal points are: the interchangeability of the lever arms 5 and 5', the interchangeability of the cross-piece 12, the double-acting of the grooves 8 and 8' made directly on the arms 5 and 5', the possibility of connecting the push rod 1 with a copy device. Inside the protection field of this invention there are all selfcentering double-acting work-rests without return springs, without gears and racks, having two levers provided with double-acting grooves to enslave the angular opening and closing action of said levers to the axial opening and closing sliding of the central push rod by means of rollers set in a cross-piece. It is just the grooving of said levers the inventive point of this invention because it realizes the double-acting grasp both closing from the outside and expanding from the inside.

Every expert in the field of selfcentering work-rests provided with three rollers is now acquainted with the original characteristics of connected joints with double-acting grooves and now he can realize so characterized selfcentering work-rests with any inventive effort.

I claim:

1. A self-centering work support comprising a support body, a push rod slidably mounted in said body, and having workpiece support means on one end thereof, power means for reciprocating said pushrod in said support body, a pair of two arm levers, means for pivotally and detachably mounting said levers on said body on opposite sides of said push rod with workpiece support means provided on one arm of each lever and a curved cam slot in the other arm of each lever, a cross arm, means for detachably mounting said cross arm on said push rod and a pair of rollers, means rotatably mounting said rollers on said crossarm with each roller disposed within a respective slot so that upon reciprocating movement of said push rod said arms will be pivoted to bring said workpiece support means into and out of engagement with a workpiece.

2. A self-centering work support as set forth in claim 1 further comprising an external cam surface formed on each lever parallel to said slot in opposing relation to each other and a pair of additional rollers, means rotatably mounting said additional rollers on said cross arm with each additional roller disposed in engagement with a respective external cam surface for shifting said workpiece support means on said levers into engagement with a workpiece upon movement of said workpiece support means on said push rod toward the workpiece.

* * * * *